United States Patent
Gaber (10) Patent No.: US 9,645,335 B2
(45) Date of Patent: May 9, 2017

(54) NON-INTRUSIVE MONITORING OPTICAL CONNECTION APPARATUS

(71) Applicant: Rax Connect Ltd., Haifa (IL)

(72) Inventor: Benny Gaber, Haifa (IL)

(73) Assignee: Rax Connect Ltd., Haifa (IL)

( * ) Notice: Subject to any disclaimer, the term of this patent is extended or adjusted under 35 U.S.C. 154(b) by 0 days.

(21) Appl. No.: 14/652,795

(22) PCT Filed: Dec. 10, 2013

(86) PCT No.: PCT/US2013/073987
§ 371 (c)(1),
(2) Date: Jun. 17, 2015

(87) PCT Pub. No.: WO2014/099457
PCT Pub. Date: Jun. 26, 2014

(65) Prior Publication Data
US 2015/0323752 A1    Nov. 12, 2015

Related U.S. Application Data (60) Provisional application No. 61/737,829, filed on Dec. 17, 2012.

(51) Int. Cl.
G02B 6/38 (2006.01)
G02B 6/42 (2006.01)
G02B 6/28 (2006.01)

(52) U.S. Cl.
CPC ......... *G02B 6/4287* (2013.01); *G02B 6/2852* (2013.01); *G02B 6/3825* (2013.01); *G02B 6/3826* (2013.01); *G02B 6/3845* (2013.01); *G02B 6/3853* (2013.01); *G02B 6/3877* (2013.01); *G02B 6/2817* (2013.01)

(58) Field of Classification Search
USPC .................................................. 385/31, 37
See application file for complete search history.

(56) References Cited

U.S. PATENT DOCUMENTS

| 4,881,789 A | 11/1989 | Levinson |
| 4,941,724 A | 7/1990 | Couden |
| 9,497,016 B2 * | 11/2016 | Suzuki ................. G02B 6/3825 |

(Continued)

FOREIGN PATENT DOCUMENTS

| JP | S57-27202 | 2/1982 |
| JP | 2005-208239 | 8/2005 |
| JP | 2011-150279 | 8/2011 |

OTHER PUBLICATIONS

PCT Written Opinion PCT/US2013/073987, Aug. 4, 2014.

*Primary Examiner* — Eric Wong
(74) *Attorney, Agent, or Firm* — Dekel Patent Ltd.; David Klein (57) ABSTRACT

A non-intrusive monitoring optical connection apparatus includes first and second fiber optic communication lines (2, 8) arranged for light to pass therebetween. The first and second fiber optic communication lines (2, 8) have first and second ferrules (4, 6) at ends thereof, respectively. An optical element (13, 25) is disposed between the fiber optic communication lines (2, 8). Most of the light passes between the fiber optic communication lines (2, 8) and a small part of the light is harvested by the optical element (13, 25) and detected by a photo detector (15, 28).

17 Claims, 9 Drawing Sheets (56) References Cited

U.S. PATENT DOCUMENTS

2008/0069497 A1* 3/2008 Tissot ................ G02B 6/29317
    385/37
2010/0329604 A1* 12/2010 Kojima ................ G02B 6/2852
    385/31

* cited by examiner

NON-INTRUSIVE MONITORING OPTICAL CONNECTION APPARATUS

FIELD OF THE INVENTION

The present invention generally relates to non-intrusive monitoring of light signals between two fiber optic communication lines.

BACKGROUND OF THE INVENTION

There are many optical connections used in fiber optics, such as in distribution frames, patch panels, fiber optic adapters and termination devices. Such systems often require non-intrusive monitoring of light signals between two fiber optic communication lines. However, these systems do not offer cost effective solutions for non-intrusive monitoring. Prior art solutions for monitoring an active line include disconnecting and attaching a monitor device to each of the ends of the fiber optic lines.

Another solution utilizes a splitter which requires expensive tooling and extra spacing with an additional box. (See PCT patent application PCT/US2010/025293, "Fiber Optic Cross Connect with Non-Intrusive Monitoring and Circuit Tracer", to Benny Gaber).

SUMMARY

The present invention seeks to provide methods and apparatus for non-intrusive monitoring of light signals between two fiber-optic communication lines, such as but not limited to, distribution frames, patch panels, fiber optic adapters and termination devices.

In one embodiment of the invention, an optical element is disposed between two fiber optic communication lines. Most of the light from the transmitting fiber is received at the receiving fiber, whereas the optical element harvests only a small part of the light signals, thus achieving efficient non-intrusive monitoring without interrupting the ongoing transmission of optical information data in both directions between the two fiber optic communication lines. The harvested light from the optical element is directed onto a photo detector or a light guide attached to the optical element. If necessary, the light guide may optionally have an infrared (IR) coating that serves to change the wavelength from IR into visible light.

In accordance with an embodiment of the present invention, the optical element is a side-emitting ferrule. For example, the ferrule may have an optical opening in its cladding, perpendicular to its axial axis, allowing harvesting part of the light energy in the cladding which is emitted through the opening. The harvested light is detected by at least one photo detector attached to the opening on the ferrule side, again without interrupting the transmission of optical information data. The partially optical opening in its cladding could be on a ferrule of the fiber optic line itself. The at least one photo detector on the opening in the cladding may consist of a plurality of photo detectors. The photo detector or detectors may be of narrow band wavelength. The photo detecting system allows for remote monitoring.

In yet another embodiment of the present invention a non-intrusive monitoring device in a fiber optic connection is provided wherein the optical element is a ferrule size lens set including first and second discs and a cylinder with a density filter and a collimating lens shape on both ends of the cylinder. A first fiber optic communication line ferrule is attached to the first disc. Light exiting the first fiber optic communication line ferrule, in its numerical aperture angle, is collimated at the first end collimated lens shape of the cylinder. The light beam travels as a large collimated beam in the density filter cylinder and exits at the second collimated lens face, where it is concentrated into a second fiber optic communication line. The cylinder includes on its side face, perpendicular to its axial axis, at least one photo-detector. This allows for part of the light in the collimated beam in the cylinder to be dispersed, reflected and detected by the photo-detector.

In another embodiment of the present invention, which utilizes the ferrule size optical element, the cylinder is fully transparent and has a notch on its side face, opposite the photo-detector, thereby reflecting part of the collimated beam that may come from each direction onto the photo-detector.

In another embodiment of the present invention, which utilizes the ferrule size optical element, a light guide is attached to the cylinder instead of the photo-detector. In another embodiment of the present invention, which utilizes the ferrule size optical element, a light guide is attached to the cylinder and is coated with IR coating changing the wavelength from IR into visible light, allowing monitoring without interrupting the ongoing transmission of optical information data.

BRIEF DESCRIPTION OF THE DRAWINGS

The disclosure will be understood and appreciated more fully from the following detailed description taken in conjunction with the drawings in which:

FIG. 2.1 is a simplified side translucent view illustration of a non-intrusive monitoring system with an optical element ferrule and photo detector.

FIG. 2.2 is a simplified cutaway view illustration of an optical element ferrule with photo detector.

FIG. 3.1 is a simplified enlarged view illustration of an optical element ferrule with photo detector.

FIG. 3.2 is a simplified general view illustration of an optical ferrule cut.

FIG. 5.1 is a simplified isometric cutaway view illustration of a photo detector on the ferrule line end.

FIG. 5.2 is a simplified cutaway view illustration of a photo detector on the ferrule line end.

FIG. 5.3 is a simplified enlarged view illustration of a photo detector on the ferrule line end.

FIG. 6.1 is a simplified general view illustration of a photo detector on the ferrule line end.

FIG. 6.2 is a simplified general view illustration of a cut in the ferrule line end.

FIG. 8.1 is a simplified front cutaway view illustration of a non-intrusive monitor system where the optical element is a ferrule with a side opening.

FIG. 8.2 is a simplified front cutaway view illustration of a non-intrusive monitor system where the optical element is a ferrule with a side opening and an IR coated light guide.

FIG. 9.1 is a simplified cutaway view illustration of a non-intrusive monitor system where the optical element is a set of two discs and a cylinder with density filter and collimated faces, and including a photo detector.

FIG. 9.2 is a simplified cutaway view illustration of a non-intrusive monitor system where the optical element is a set of two discs and a cylinder with density filter and collimated faces and photo detector, showing the light path.

FIG. 9.3 is a simplified side cutaway view illustration of a non-intrusive monitor system where the optical element is a set of two discs and a cylinder with density filter and collimated faces and photo detector, showing the dispersed light reflected onto the photo detector.

FIG. 10 also shows the dispersed light reflected onto the photo detector.

DETAILED DESCRIPTION OF EMBODIMENTS

Figure 1:
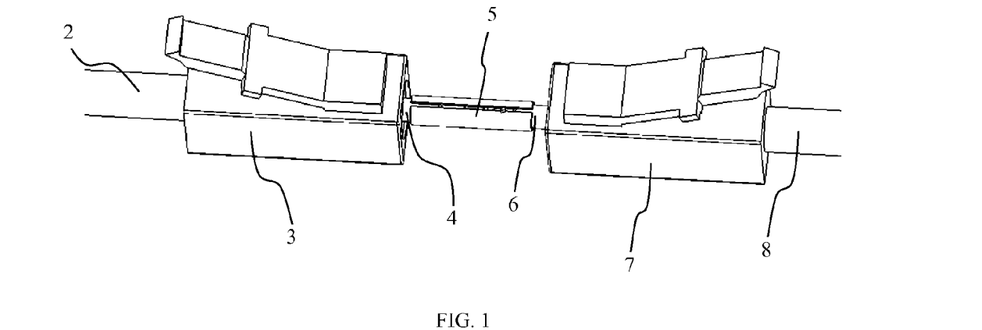
FIG. 1 is a simplified general view illustration of a non-intrusive monitoring system with optical element ferrule and photo detector, in accordance with an embodiment of the present invention.

Reference is now made to FIG. 1, which illustrates a non-intrusive monitoring system 1, in accordance with an embodiment of the present invention, which includes a fiber optic connection with an optical element ferrule and photo detector, as is now described.

Figure 32:
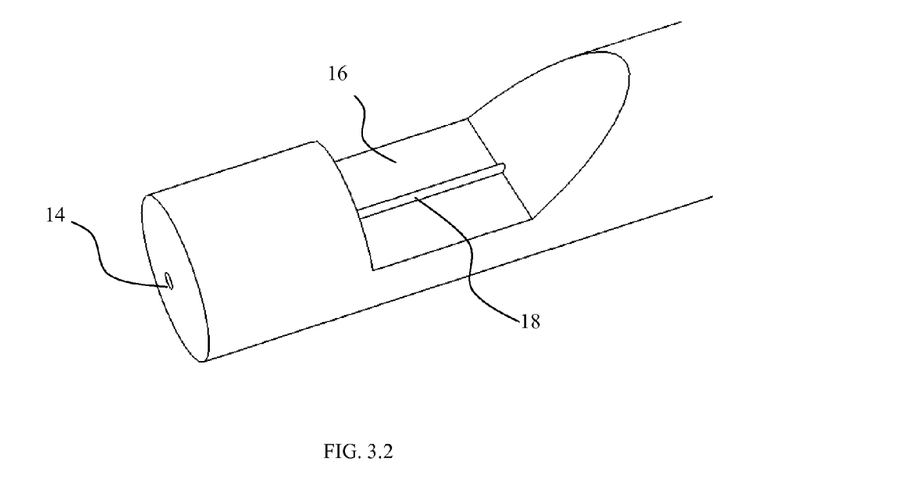
Figure 51:
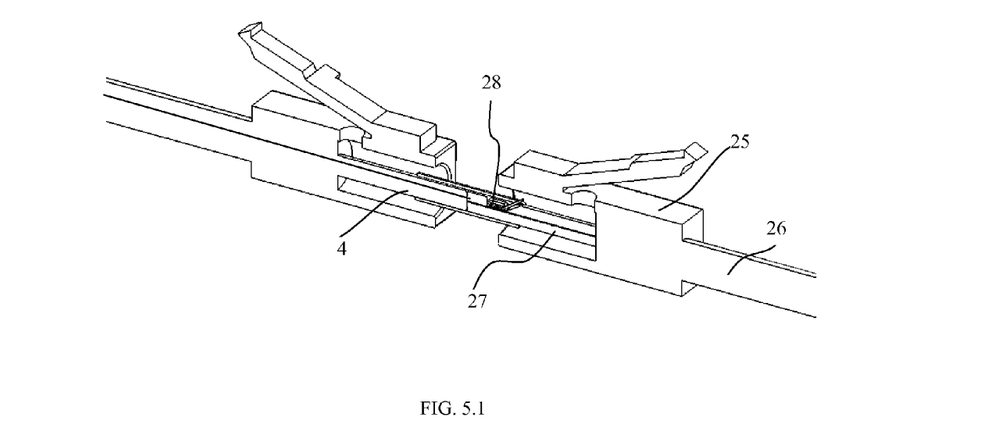
Figure 52:
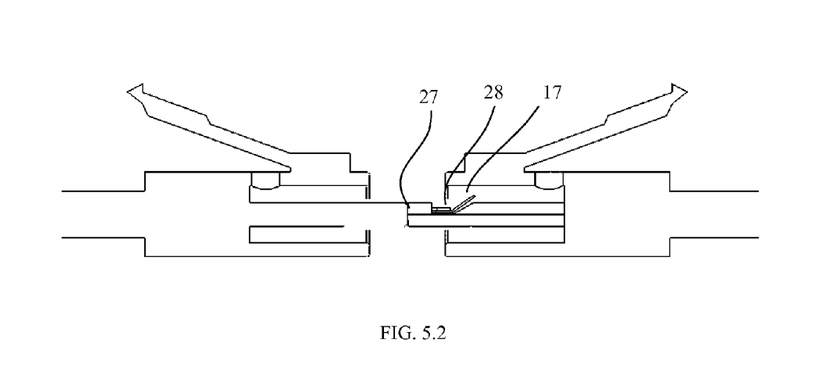
Figure 53:
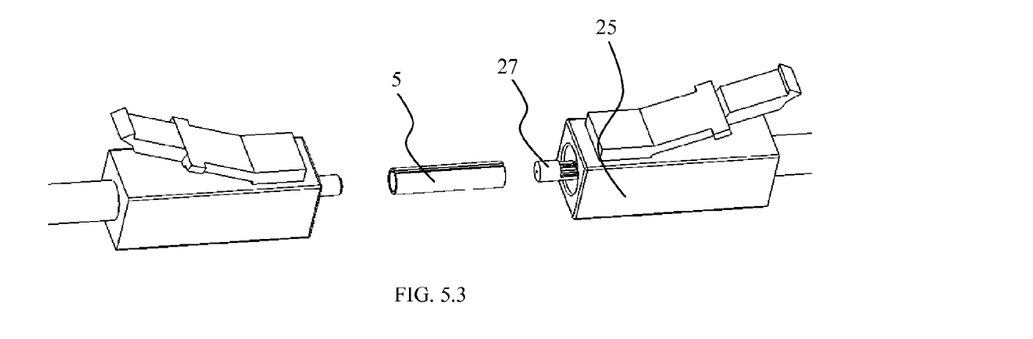
Figure 61:
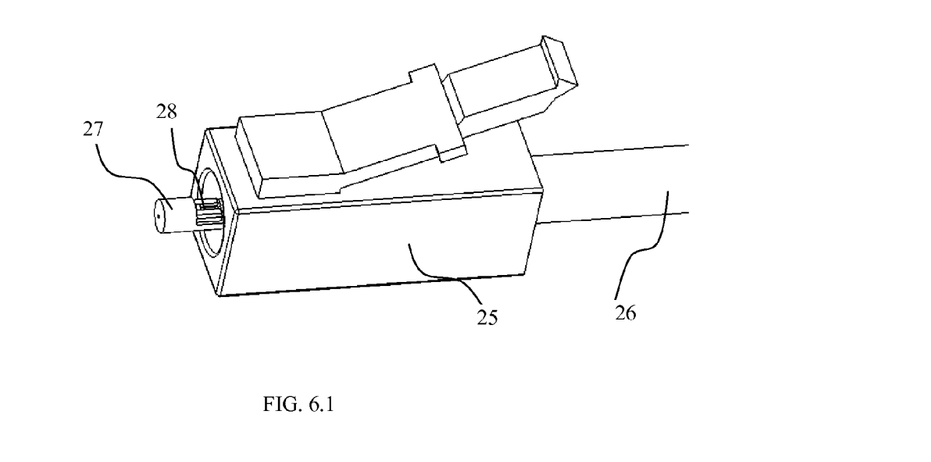
Figure 62:
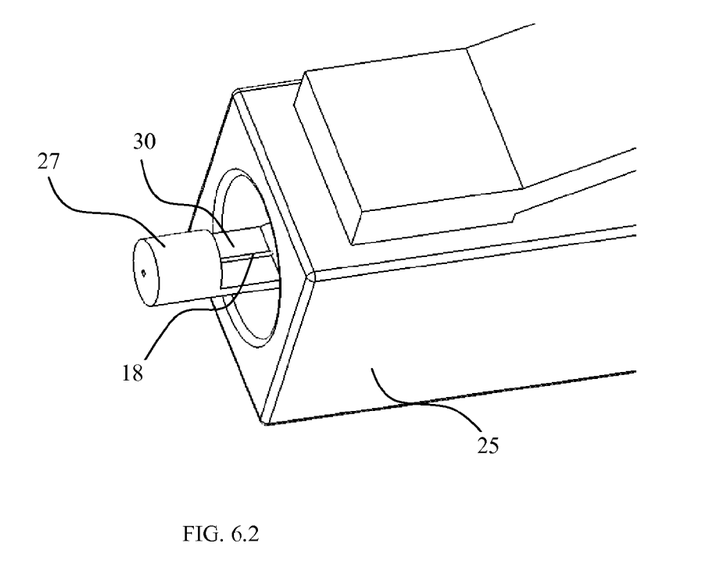

A first connector 3 is connected to an end of a first fiber optic line 2. The first connector 3 includes a first ferrule 4, which is inserted into one end of a centering tube 5. Similarly, a second connector 7 is connected to an end of a second fiber optic line 8. The second connector 7 includes a second ferrule 6, which is inserted into an opposite end of centering tube 5. Tube 5 centers the core 85 and the cladding 14 (85 and 14 are shown in FIG. 3.2) of the fiber optic lines in the ferrules.

Figure 21:
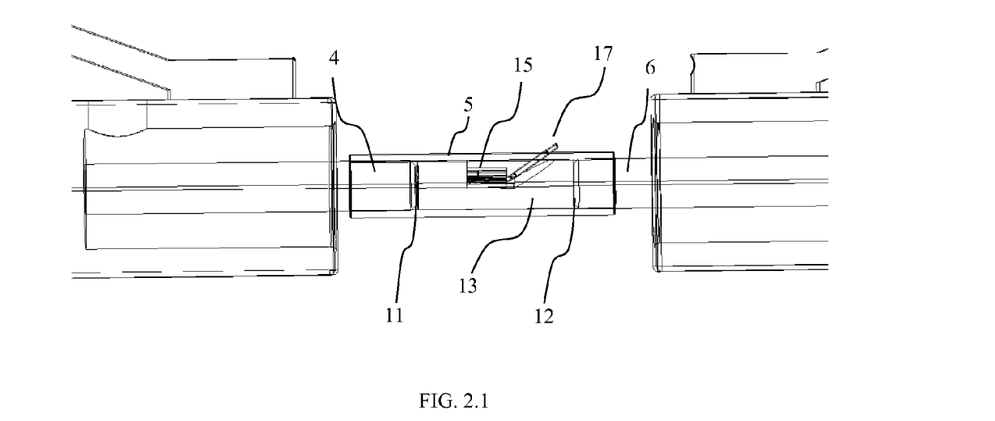
Figure 22:
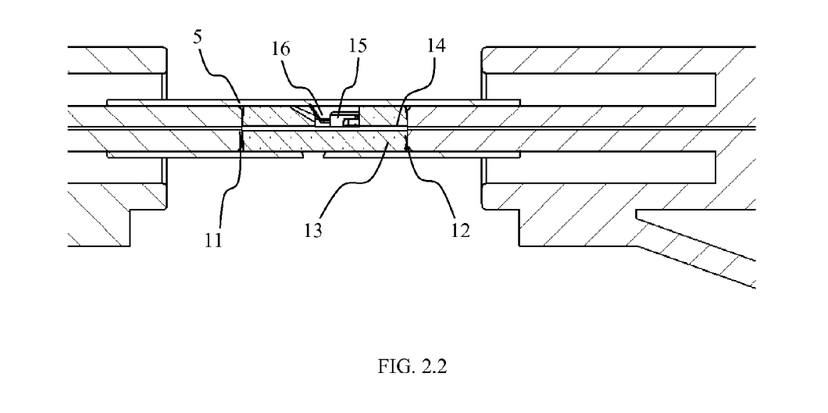
Figure 31:
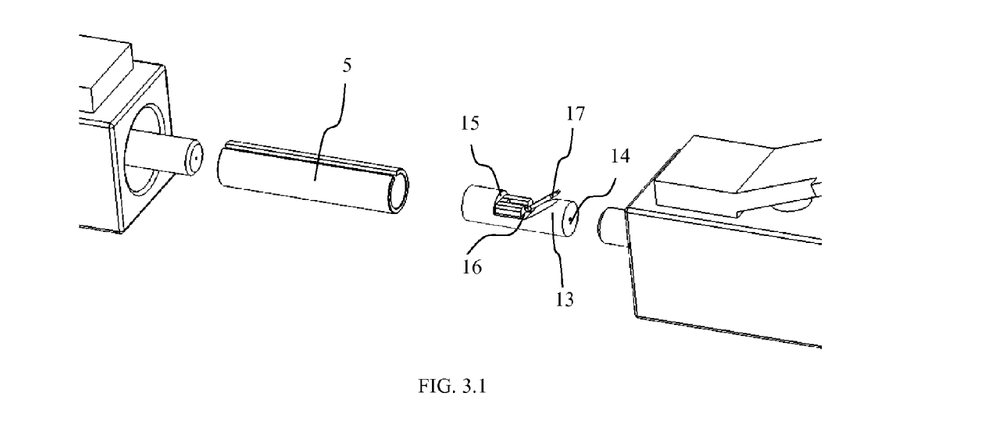

Reference is now made to FIGS. 2.1, 2.2 and 3.1. An inner optical element ferrule 13 (also referred to as an intermediate ferrule) with a side opening 16 (seen in FIGS. 2.2 and 3.1) is centered in centering tube 5 between first ferrule 4 and second ferrule 6. The inner optical element ferrule 13 firmly contacts the end of first ferrule 4 at first contact area 11 and firmly contacts the end of second ferrule 6 at second contact area 12. Photo detector 15, having lead wires 17, is mounted on inner optical element ferrule 13. The side opening 16 is cut in the inner optical element ferrule 13 and photo detector 15 may be mounted in this opening, as seen in FIG. 3.1.

Figure 81:
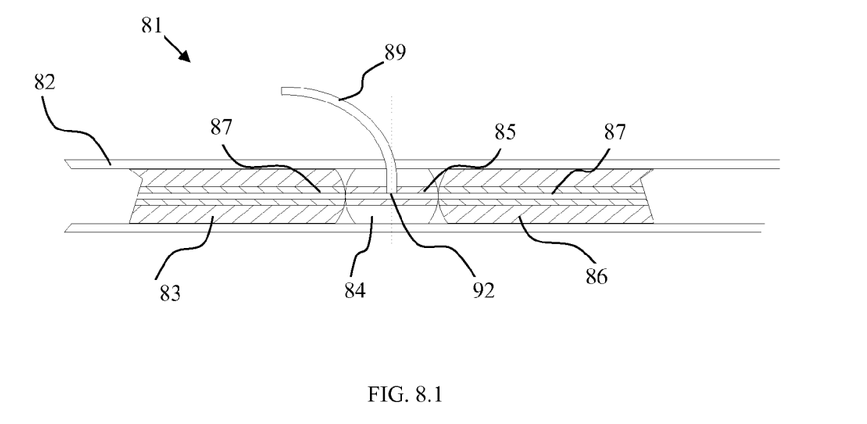
Figure 82:
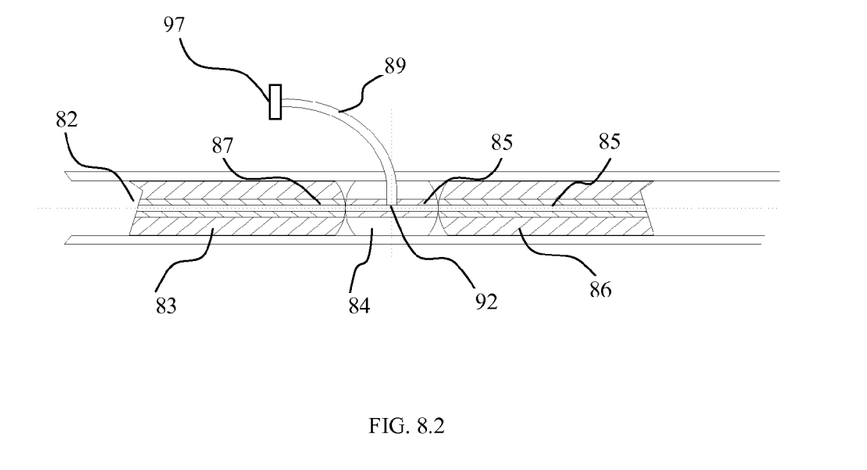

Reference is now made to FIG. 3.2. It is seen that the side opening 16 of inner optical element ferrule 13 cuts into the cladding 14 to expose an exposed portion 18 of cladding 14 without penetrating the core 85 (also seen in FIGS. 8.1 and 8.2). The photo detector 15 is mounted over the exposed portion 18 in cladding 14. The invention exploits the normal loss of light transmission into the cladding of real-world, non-perfect optic fibers and harvests this small amount of light for detection by the photo detector.

Reference is now made to FIGS. 4-7, which illustrate a non-intrusive monitoring system 24, in accordance with another embodiment of the present invention. Elements which are common to systems 1 and 24 are designated by the same reference numeral. System 24 differs from system 1 in that system 24 does not have an inner optical element ferrule that contacts the first and second ferrules and wherein the opening in the cladding for the photo detector is on the ferrule on the fiber optic line ending itself, as is now explained.

Figure 4:
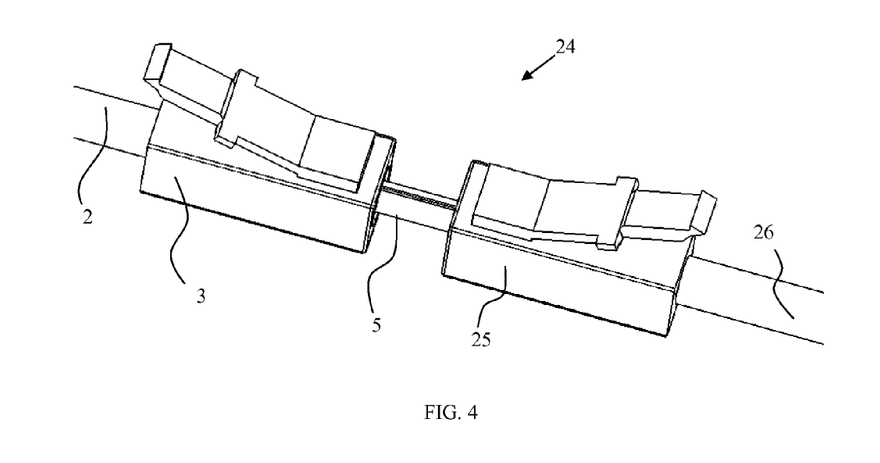
FIG. 4 is a simplified general view illustration of a non-intrusive monitoring system with the photo detector on the ferrule line end.

In system 24, first connector 3 is connected to an end of first fiber optic line 2. The first connector 3 includes first ferrule 4, which is inserted into one end of a centering tube 5. Similarly, a second connector 25 is connected to an end of a second fiber optic line 26. The second connector 25 includes a second ferrule 27, which is inserted into an opposite end of centering tube 5. Tube 5 centers the core and the claddings in the ferrules.

Figure 7:
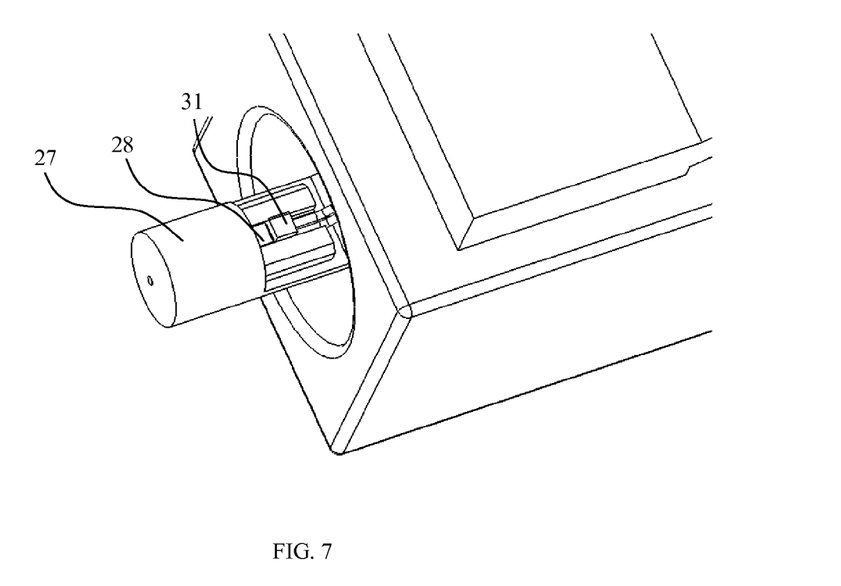
FIG. 7 is a simplified general view illustration of two photo detectors on the ferrule line end.

The second ferrule 27 is formed with a side opening 30 (seen in FIG. 6.2) cut into the ferrule 27 itself and into part of cladding 14 without penetrating the core 85 (seen in FIGS. 8.1 and 8.2), thereby exposing an exposed portion 18 of the cladding of the fiber 27. A photo detector 28, having lead wires 17, is mounted over the exposed portion 18. As seen in FIG. 7, more than one photo detector may be mounted over the exposed portion 18 of the fiber, such as an additional photo detector 31.

Reference is now made to FIGS. 8.1 and 8.2, which illustrate a non-intrusive monitoring system 81, in accordance with another embodiment of the present invention. A first ferrule 83 and a second ferrule 86 are centered in a centering tube 82, which may be C-shaped. An intermediate ferrule 84, which is formed with a side opening 92, is also centered in the C-shaped tube 82. All the ferrules are firmly axially attached to each other. The claddings of the fiber optics in the ferrules are designated by the numeral 87 and the fiber optic cores are designated by the numeral 85. The side opening 92 of intermediate ferrule 84 is formed in the fiber optic cladding 87 but does not penetrate the fiber optic core 85. A light guide 89 is disposed in side opening 92. As seen in FIG. 8.2, light guide 89 may be coated with light guide IR coating 97 that changes IR into visible light waves.

Figure 91:
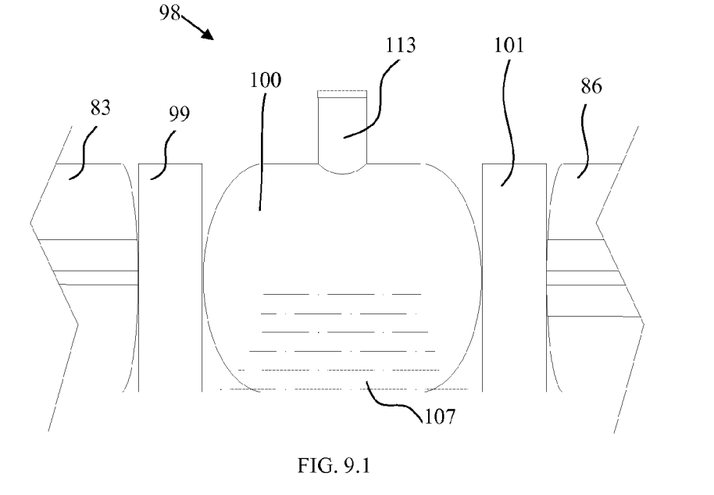

Reference is now made to FIG. 9.1, which illustrates a non-intrusive monitor system 98 in accordance with another embodiment of the present invention.

Figure 92:
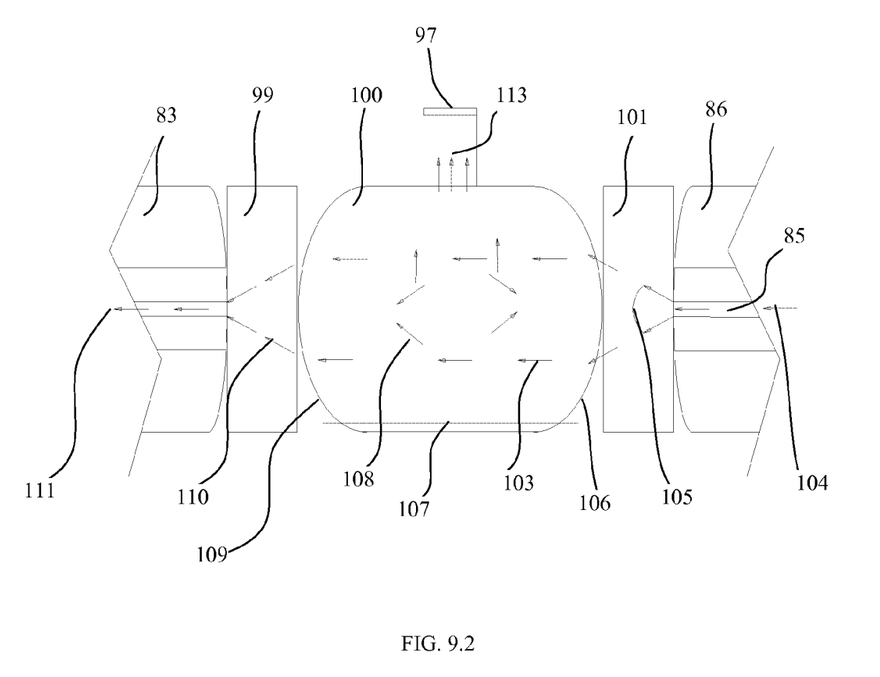

System 98 is a ferrule size lens set 98, which may use the first ferrule 83 and second ferrule 86 of the previous embodiment. First ferrule 83 is firmly attached to a first disc 99 which is firmly attached to one end of a density filter cylinder 100. Second ferrule 86 is firmly attached to a second disc 101 which is firmly attached to an opposite end of cylinder 100. The two ends of cylinder 100 each have a collimating lens shape 106 and 109 (seen in FIG. 9.2). Cylinder 100 may be coated with a reflecting coating on its reflecting side 107. A light guide 113 is attached to a side of cylinder 100. Light guide 113 is perpendicular to the cylinder axial axis and is opposite to the reflecting coating on the reflecting side 107.

Reference is now made to FIG. 9.2. Light 104 exits second ferule 86 and enters second disc 101 at a numerical aperture angle of light 105. The light is collimated into a collimated beam 103 in density filter cylinder 100 by first collimating face 106. Most of the light in collimated beam 103 reaches second collimating face 109 and exits therefrom as light rays 110 which combine as light beam 111 in first ferrule 83. Part of the light in collimated beam 103 is dispersed in density filter cylinder 100 as light rays 108. Light 108, together with light reflected from reflecting coating 107, enters light guide 113 (which may or may not be coated with an IR coating, as described above).

Figure 93:
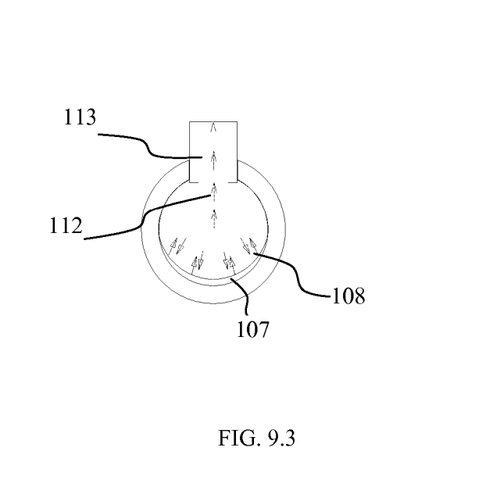

Reference is now made to FIG. 9.3. The light 108 dispersed in density filter cylinder 100 and the light reflecting from reflecting coating 107 is directed towards light guide 113 as dispersed and reflected light 112. The discs and the faces of the cylinder may be coated with anti-reflecting coating.

Figure 10:
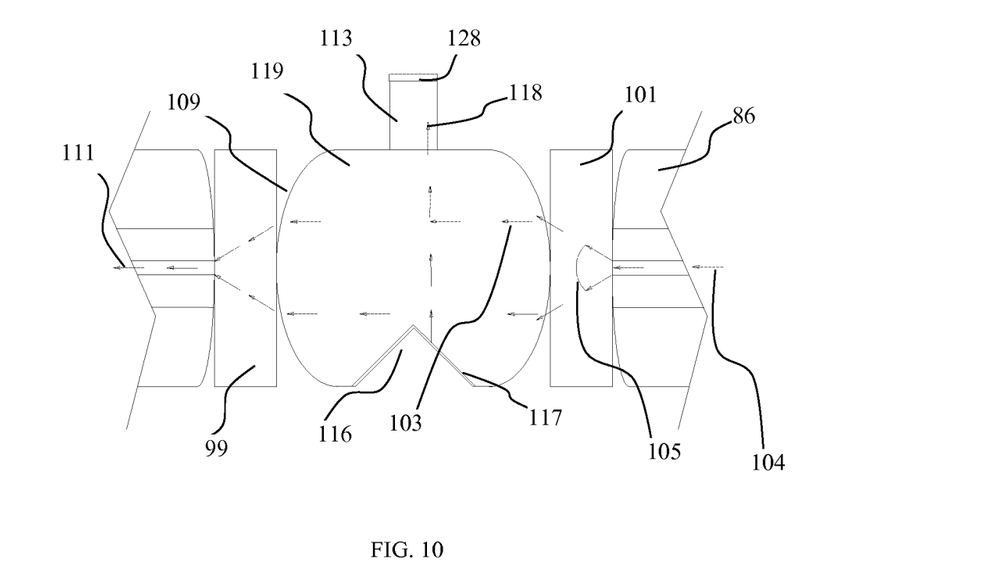
FIG. 10 is a simplified side cutaway view illustration of a non-intrusive monitor system wherein the optical element is a set of two discs and a cylinder with collimated faces and a photo detector, wherein the cylinder is fully transparent and has a notch on its side faces opposite the photo detector, thereby reflecting part of the collimated beam that may come from each direction onto the photo-detector.

Reference is now made to FIG. 10. The system of FIG. 10 is similar to the system of FIGS. 9.1-9.3, except that in the system of FIG. 10 a clear cylinder 119 is employed which is formed with a coated notch 116 with notch reflecting coating faces 117. In this embodiment, most of the light from collimated beam 103 reaches first collimating face 109 and is collimated into light in first ferrule 111. Part of the light in collimated beam 103 is reflected by notch reflecting coating faces 117 as reflected beam 118 which is directed towards light guide 113. Light guide 113 may be provided with a photo detector 128 and may or may not be coated with an IR coating, as described above.

What is claimed is:

1. A non-intrusive monitoring optical connection apparatus comprising:
   first and second fiber optic communication lines arranged for light to pass therebetween, said first and second fiber optic communication lines having first and second ferrules at ends thereof, respectively;
   wherein one of the ferrules of said fiber optic communication lines has an opening perpendicular to an axial axis of the ferrule, said opening being formed through part of cladding of said fiber optic communication line in said ferrule but not through a core of said fiber optic communication line, wherein the small part of the light that travels in the cladding is emitted through the opening;
   and wherein said first ferrule is inserted into one end of a centering tube and said second ferrule is inserted into an opposite end of said centering tube, said centering tube configured to center said core and said cladding of said fiber optic lines in said first and second ferrules;
   and further comprising an inner optical element ferrule formed with a side opening, said inner optical element ferrule being centered in said centering tube between said first ferrule and said second ferrule and contacting an end of said first ferrule at a first contact area and an end of said second ferrule at a second contact area;
   and wherein a photo detector is mounted in said side opening of said inner optical element ferrule.

2. The non-intrusive monitoring optical connection apparatus according to claim 1, wherein said
   side opening is perpendicular to an axial axis of the inner optical element ferrule, said opening being formed through part of cladding of said fiber optic communication line but not through a core of said fiber optic communication line, wherein the small part of the light that travels in the cladding is emitted through the side opening, and wherein said side opening exposes an exposed portion of said cladding and said photo detector is mounted over the exposed portion.

3. The non-intrusive monitoring optical connection apparatus according to claim 1,
   and further comprising more than one photo detector, and at least one of said photo detectors having a narrow band wavelength.

4. The apparatus according to claim 1, wherein the harvested light is directed into a light guide.

5. The apparatus according to claim 4, wherein the light guide is coated with an IR coating changing infrared into visible light.

6. The apparatus according to claim 4, wherein said photo detector is attached to the light guide.

7. The apparatus according to claim 1, wherein said centering tube is C-shaped.

8. The apparatus according to claim 1, wherein said optical element comprises a density filter cylinder with opposing faces, each face having a collimating lens shape, wherein said first ferrule is attached to a first disc which is attached to one end of said cylinder and said second ferrule is attached to a second disc which is attached to an opposite end of said cylinder where light entering the cylinder is collimated in the cylinder and light dispersed in the density filter cylinder is detected by said photo detector mounted on a side of said cylinder.

9. The apparatus according to claim 8, wherein said cylinder is coated with a reflecting coating on a reflecting side thereof and a light guide is attached to a side of said cylinder perpendicular to an axial axis of said cylinder and opposite said reflecting coating.

10. The apparatus according to claim 8, wherein the discs and the faces of the cylinder are coated with anti-reflecting coating.

11. The apparatus according to claim 8, wherein said cylinder is made of clear material and formed with a coated notch with notch reflecting coating faces which reflect some of the light that is collimated in the cylinder towards a light guide or photo detector.

12. The apparatus according to claim 2, wherein the harvested light is directed into a light guide.

13. The apparatus according to claim 12, wherein said photo detector is attached to the light guide.

14. The apparatus according to claim 2, wherein said optical element comprises a density filter cylinder with opposing faces, each face having a collimating lens shape, wherein said first ferrule is attached to a first disc which is attached to one end of said cylinder and said second ferrule is attached to a second disc which is attached to an opposite end of said cylinder where light entering the cylinder is collimated in the cylinder and light dispersed in the density filter cylinder is detected by said photo detector mounted on a side of said cylinder.

15. The apparatus according to claim 3, wherein the harvested light is directed into a light guide.

16. The apparatus according to claim 15, wherein said photo detector is attached to the light guide.

17. The apparatus according to claim 3, wherein said optical element comprises a density filter cylinder with opposing faces, each face having a collimating lens shape, wherein said first ferrule is attached to a first disc which is attached to one end of said cylinder and said second ferrule is attached to a second disc which is attached to an opposite end of said cylinder where light entering the cylinder is collimated in the cylinder and light dispersed in the density filter cylinder is detected by said photo detector mounted on a side of said cylinder.

* * * * *